Feb. 6, 1940.    W. T. DUSTERDICK    2,189,200
MACHINE FOR FRYING FOOD
Filed June 24, 1938    2 Sheets-Sheet 1
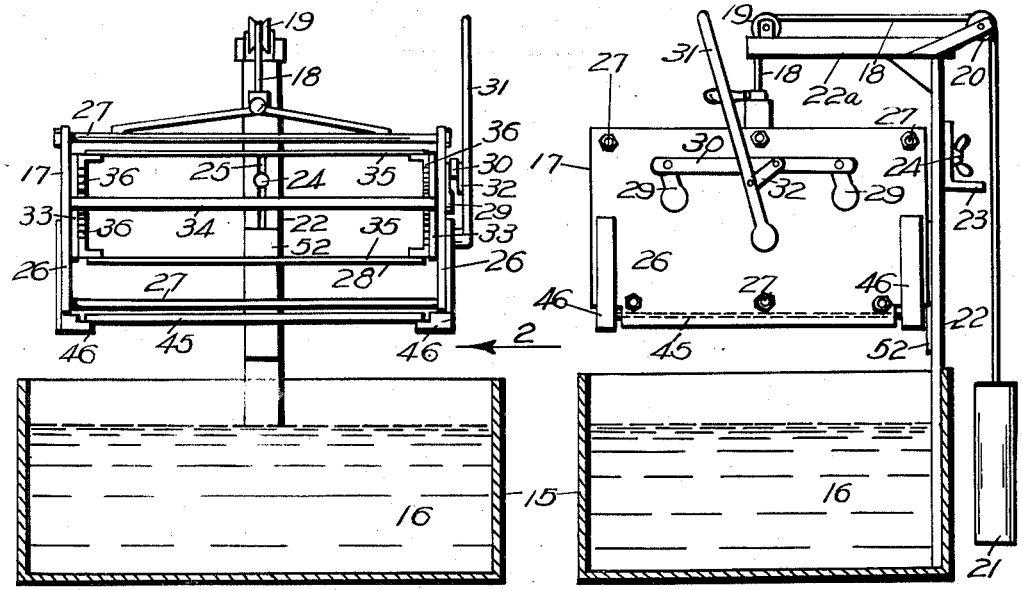
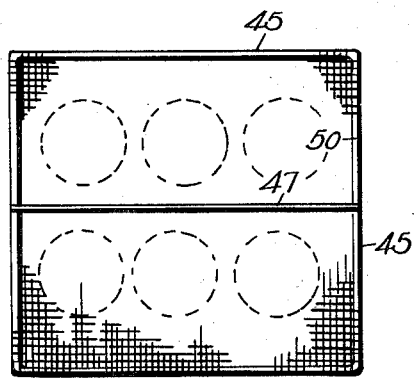
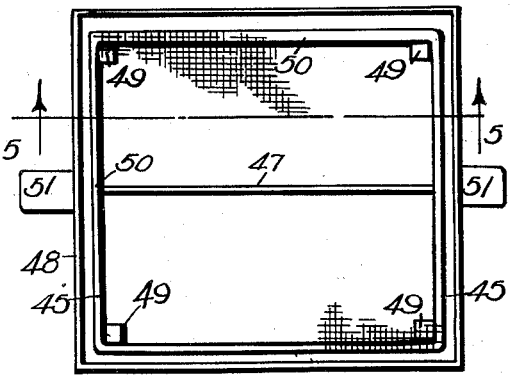
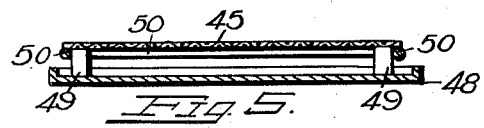
INVENTOR.
WILLIAM T. DUSTERDICK
BY Rollandet, McGrew and Campbell
ATTORNEYS Feb. 6, 1940.    W. T. DUSTERDICK    2,189,200
MACHINE FOR FRYING FOOD
Filed June 24, 1938    2 Sheets-Sheet 2
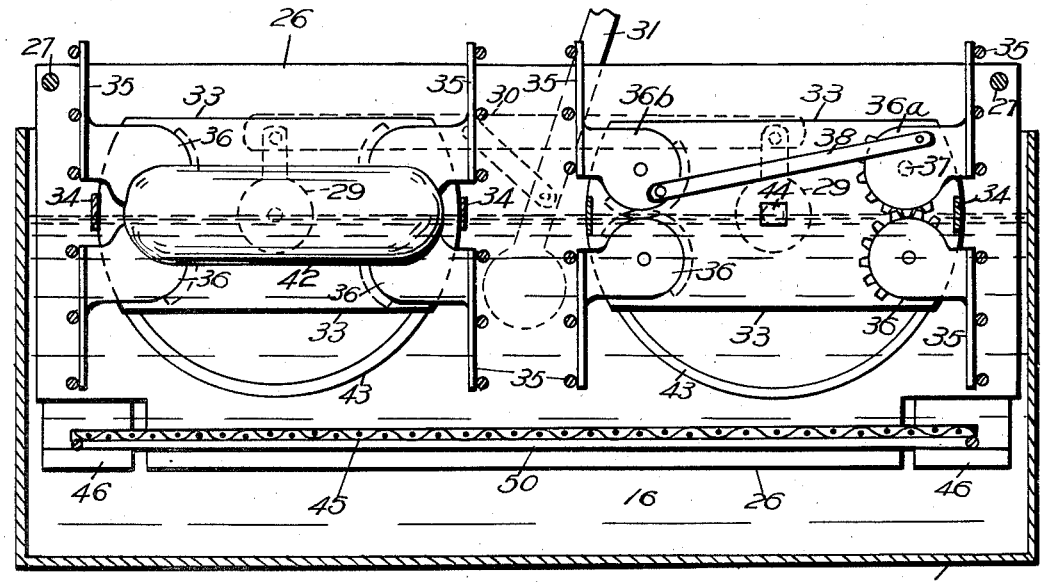
Fig. 6.
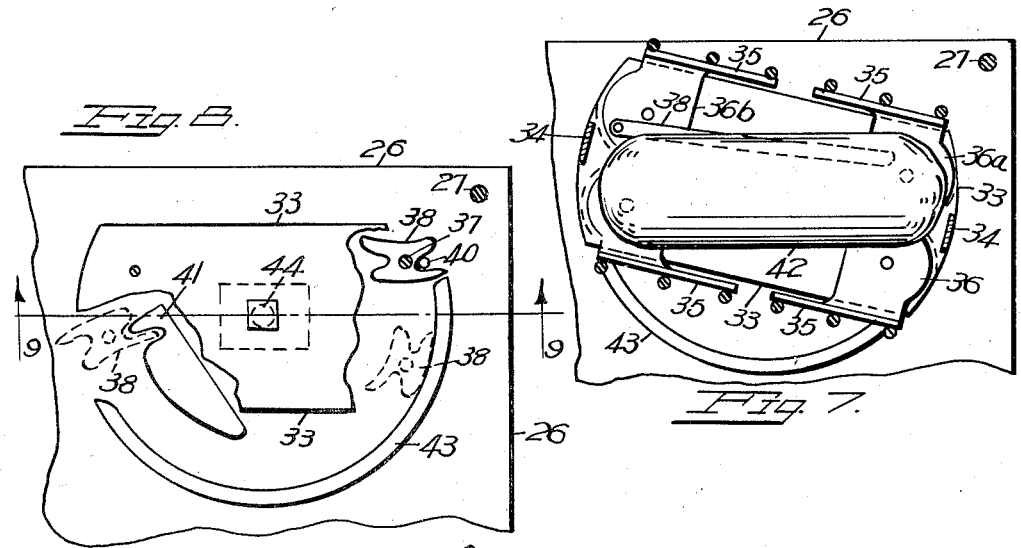
Fig. 8.
Fig. 7.
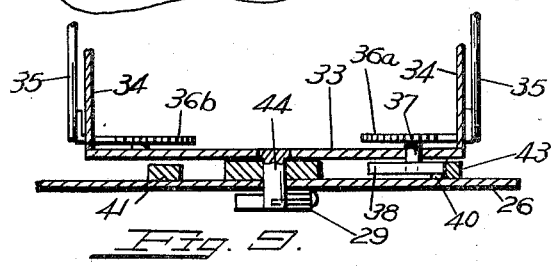
Fig. 9.
INVENTOR.
WILLIAM T. DUSTERDICK
BY
ATTORNEYS.

Patented Feb. 6, 1940

2,189,200

UNITED STATES PATENT OFFICE 2,189,200

MACHINE FOR FRYING FOOD

William T. Dusterdick, Denver, Colo.

Application June 24, 1938, Serial No. 215,605

19 Claims. (Cl. 53—7)

This invention relates to an improved device for frying doughnuts and the like in a liquid frying medium.

It is an object of the invention to provide, in combination with a container for frying-liquid, mechanism into which the uncooked dough may be placed and thereby be dipped or immersed into the liquid, preferably a melted edible grease, and by which the doughnuts after frying may be removed.

Another object is to provide in such a mechanism a rotatable cage-like holder for the doughnuts which will float at the surface of the liquid, for the purpose of maintaining the doughnuts in alined formation and for turning them over so that they may be fried on both sides.

A further object is to provide such mechanism that has a plurality of rotatable cage-like enclosures that are connected together for manual simultaneous rotation.

Still another object is to provide a mechanism of this kind that is counterweighted so that it may easily be raised and lowered into the liquid grease and which can be positioned with reference to the level of the surface of the liquid which level may vary from day to day or from hour to hour during use.

A still further object is to provide such a rotary cage element that is normally opened at its top and bottom and which has grill-like closing means that automatically close and open the cage to hold or release the doughnuts therein, when the cage is rotated for the purpose set forth.

Still another object is the provision of means for removing the hot doughnuts from the machine after they have been fried, said means being operable in a manner to avoid touching the finished product or any part of the heated mechanism, and which will catch the natural drainage of the grease from the doughnuts.

Other objects and advantages reside in details of design and construction which will be more fully disclosed in the following description and in the drawings wherein like parts have been similarly designated and in which:

Figure 1 is a front view partially in section of a machine that embodies a preferred form of the invention;

Figure 2 is a side view partially in section of the same looking in the direction of arrow 2, of Figure 1;

Figure 3 is a plan view of an element per se, that is shown in the assembly in Figure 1;

Figure 4 is a plan view of a carrier that is well adapted to carry the element shown in Figure 3;

Figure 5 is a sectional view taken along the line 5—5, of Figure 4;

Figure 6 is a sectional view drawn to a larger scale of certain details of the machine illustrated in Figures 1 and 2;

Figure 7 is a fragmentary sectional view illustrating the operation of a portion of the mechanism shown in Figure 6;

Figure 8 is a fragmentary sectional view of a portion of the mechanism shown in Figures 6 and 7; and Figure 9 is a sectional view taken along the line 9—9 of Figure 8.

Referring first to Figures 1 and 2 a container is shown at 15 in which there is a body of heated liquid 16 for the purpose of cooking doughnuts or the like, which liquid is commonly melted or liquid edible grease. Suspending above the liquid is a mechanism designated as a whole by reference character 17 and which is adapted to be dipped or immersed into the liquid for the purpose of placing doughnuts or the like therein and for the further purpose of turning them to be cooked on both sides, and finally for removing the finished product from the hot grease. In the form of the device herein illustrated mechanism 17 is suspended on a cord 18 which passes over pulleys 19 and 20, the mechanism being counterbalanced by a weight 21. At a suitable location on a vertical support 22 is a movable projecting element 23 which may be secured at predetermined selected positions by means of a bolt and wing nut designated as 24 which is positioned through a vertical slot 25 in the support 22.

In the instant illustration, the mechanism 17 includes end plates 26 which are held together in spaced relationship by a plurality of tie rods 27 and in which are journaled a plurality of rotatable cage-like elements 28 that are rotatable by means of cranks 29. The cranks are pivotally connected by a link 30 that is manually operable by means of a lever handle 31 that is connected therewith by a short link 32. The details of construction of the rotatable elements 28 are shown in Figures 6, 7, 8 and 9 and each consists of a pair of end plates 33, the normal position of which is horizontal as shown in Figure 6. At the sides of each end plate are horizontal closure bars 34 which are in fixed relation to the end plates. Mounted on the end plates are top and bottom grill-like closures 35 for the cage elements which are capable of limited pivotal movement with reference to the end plates and which are normally in an open position as shown in Figure 6. The pivotal closures terminate in gear segments 36 one of which specifically designated as 36a, is mounted on a shaft 37 on the other end of which is a cam element 38 so that rotation of the cam will rotate the gear segment 36a which movement will be imparted in an opposite direction to the gear segment next adjacent with which it meshes and which movement will further be imparted to gear segment 36b by means of a connecting link 39. Thus it will be seen that the closures are all movable by means of the cam element 38, to open and close the cage elements.

Referring to Figures 7 and 8, relatively stationary contact elements 40 and 41 are mounted upon one of the plates 26 in such a position that when the cage element as a whole is rotated the cam element 38 will be engaged by the stationary elements 40 and 41 whereby it will be rotated with reference to the cage as a whole so that upon operation of the lever handle 31 to rotate the cage elements from their normal open position shown in Figure 6, the closures 35 will be moved to enclose a doughnut 42 floating therein as clearly shown in Figure 7. A track-like guide 43 further assists in guiding and controlling the action of the cam element 38, several operating positions of which are shown in dotted lines in Figure 8. Figure 9 further illustrates the relationship of end stationary plate 26, contact elements 40 and 41, track 43, stationary plate 33, and pivotal closures 35, the entire cage element being rotatable conjointly with a shaft 44 that is acted upon by the crank 29.

In the assembly view Figure 1 a removable screen-like element is shown at 45 that is held between spring clips 46. A plan view of this screen-like element is shown in Figure 3 and it has a line of demarcation through the center as shown at 47. A carrier element 48 is provided with upstanding supports 49 that are arranged and adapted to fit within the drop frame 50 of the screen element 45 as is clearly shown in Figures 4 and 5. The carrier is provided with handles 51 so that the operator need never touch the screen element during operation thus avoiding burns and grease. If desired, the horizontal arm 22a may be made to swivel on the support 22, to swing the assembly 17 away from the container 15.

*Operation*

In use the operator prepares and cuts the dough to shape the doughnuts or the like and places the shapes in alined rows on the screen element, 45, the line of demarcation 47 of which, assists in said alinement of the uncooked product.

The screen element 45 is carried on the carrier element 48 and is then positioned between spring clips 46 by tilting it slightly to engage above the clips on one side which clips are then pressed outwardly so that the other side of the screen element can be brought above the spring clips on the other side whereupon the carrier is removed and set aside. Next the entire mechanism 17 is lowered into the liquid cooking medium 16 to a position where the surface of the liquid is at the center of rotation of the cage-like elements 28. As the mechanism 17 is lowered into the grease, the doughnuts are floated at the surface thereof and will therefore be positioned approximately at the center of the cage elements. This relationship is clearly shown in Figure 6.

The side closures 34 of the respective cage elements maintain the cooking doughnuts in approximate alinement and after they have fried on the lower side the lever handle 31 is moved to impart rotary movement to the cage elements which rotary movement will close the pivotal closures 35 by virtue of the mechanism illustrated and described in detail hereinabove. This position is shown in Figure 7. When the cage elements and their enclosed doughnuts are rotated through approximately 180 degrees, the cam element 38 will be acted upon by the relatively stationary contact member 41 which will affect a re-opening of the pivotal closures 35 so that the position of the cage elements will be again open as shown in Figure 6. Thus the operator can turn the doughnuts or the like that are being fried over and over as much as his judgment dictates to the end that they may be properly fried on both sides. By the term "immersion" in this specification and appended claims is meant any dipping or placing of the mechanism or the articles being fried partially or wholly into the liquid frying medium. Due to the buoyancy of the doughnuts they may or may not be entirely submerged at any time during the frying process.

When the operator judges the articles to be properly fried the entire mechanism 17 with the rotary cage elements in their open position, is raised from the grease, which act will redeposit the cooked product on the screen 45. The carrier 48 is then grasped by its handles 51 and the screen with the doughnuts supported thereon is removed from the assembly by a reversing of the installation process hereinabove set forth. The carrier provides an efficient means of removing the hot screen and freshly fried doughnuts without the necessity of touching either, and the natural drainage of grease from the finished product will be caught and retained by the carrier which is preferably in the form of a shallow pan.

The projecting element 23 may be set in a position to contact the counterweight 21 to eliminate its upward movement and thereby position the mechanism assembly 17 properly in relation to the surface of the liquid grease. As the grease is used or dissipated by evaporation, the mechanism may be lowered to a corresponding degree, by raising the stop element 23. Thus the doughnuts are floated in their proper position to be acted upon by the rotary cage elements to effect the desired results.

The cage elements may be varied widely in detail of construction the object being to provide a rotatable element in which doughnuts or the like may be floated and which may be automatically closed and opened by rotary movement of said cage elements. Preferably each rotatable cage is provided with top and bottom complementary pivotal closures the mechanical details of which may be varied. The underlying screen element 45 may be any convenient type of carrier and is preferably perforate or of a screen-like construction. The mechanism assembly 17 is stabilized and guided in its up and down movements by a guide element 52 on support 22.

Obviously various types of products other than actual doughnuts may be cooked or fried in mechanism built according to this disclosure and the liquid cooking medium may vary according to preference of individual operator and it may be heated in any convenient well-known manner.

The number and the size of the rotatable elements may vary to suit conditions. Two such elements have been illustrated but one or more may be used in reducing the invention to practice. When articles are to be fried that are not capable of being floated, they are immersed on the screen or tray element 45, and remain thereon until ready for removal from the grease.

While this specification discloses preferred means for reducing the present invention to practice and a preferred embodiment of the invention, changes may occur to those skilled in the art and may be made within the scope of the appended claims, without departing from the spirit of the invention.

What I claim and desire to secure by Letters Patent is:

1. A device for frying doughnuts or the like comprising a container for frying-liquid, and mechanism inclusive of a screen member adapted to receive the doughnuts in predetermined formation for immersion into the liquid and a rotatable element positioned above said screen for turning the doughnuts after immersion.

2. A device for frying doughnuts or the like comprising a container for frying-liquid, and mechanism inclusive of a screen member adapted to receive the doughnuts in predetermined formation for immersion into the liquid and a rotatable cage positioned above said screen for turning the doughnuts after immersion.

3. A device for frying doughnuts or the like comprising a container for frying-liquid, and counterweighted movable mechanism inclusive of a member adapted to position the doughnuts in predetermined formation for immersion into the liquid and a rotatable element for turning the doughnuts after immersion.

4. A device for frying doughnuts or the like comprising a container for frying-liquid, movable mechanism inclusive of a screen member adapted to position the doughnuts in predetermined formation for immersion into the liquid and a rotatable element above said screen for turning the doughnuts after immersion, and means for positioning the mechanism at selected predetermined elevations with reference to the surface of said liquid.

5. A device for frying doughnuts or the like comprising a container for frying-liquid, and mechanism inclusive of a perforate member mounted on a spring detent and adapted to position the doughnuts in predetermined formation for immersion into the liquid and a rotatable element for turning the doughnuts after immersion.

6. A device for frying doughnuts or the like comprising a container for frying-liquid, and mechanism inclusive of a member adapted to position the doughnuts in predetermined formation for immersion into the liquid and a rotatable cage having a normally open hinged bottom closure, above said member to receive the doughnuts as they float in the liquid.

7. A device for frying doughnuts or the like comprising a container for frying-liquid, mechanism inclusive of a removable perforate member adapted to position the doughnuts in predetermined formation for immersion into the liquid and a rotatable element for turning the doughnuts after immersion, and a carrier coordinated with said perforate member for removing the same.

8. In a device of the character described, a rotary cage having pivotal enclosing members, for turning doughnuts or the like that are floated in a liquid frying medium, and mechanism connected with said closing members for operating them automatically when the cage is rotated.

9. In a device of the character described, a rotary cage having pivotal top and bottom enclosing members, for turning doughnuts or the like that are floated in a liquid frying medium, and mechanism connected with said closing members for operating them automatically when the cage is rotated.

10. In a device of the character described, a rotary cage for turning doughnuts or the like that are floated in a liquid frying medium, including a rotatable end member, a pivotal longitudinal closure for the cage, a cam on the end member and connected to rotate said closure about its pivotal axis with reference to said end member, and a relatively stationary element positioned and adapted to engage said cam to produce said pivotal movement of the closure when the cage is bodily rotated.

11. In a device of the character described, a rotary cage for turning doughnuts or the like that are floated in a liquid frying medium, including a rotatable end member, pivotal longitudinal closures for the cage, a cam on the end member and connected to rotate said closures about their pivotal axes with reference to said end member, and a relatively stationary element positioned and adapted to engage said cam to produce said pivotal movement of the closures when the cage is bodily rotated.

12. In a device of the character described, a normally open rotatable cage for turning doughnuts or the like floated in a liquid frying medium, including a rotary end member, a normally open pivotal closure for the cage, a cam on said end member connected to rotate the closure about its pivotal axis, a relatively stationary element positioned and adapted to automatically engage and rotate said cam relative to the end member for closing the cage when said cage is rotated from its normal position, and another relatively stationary member positioned and adapted to engage and rotate said cam relative to the end member for opening the cage when said cage is turned to its normal position.

13. In a device of the character described, a plurality of normally open rotatable cages for turning doughnuts or the like floated in a liquid frying medium, each including a rotary end member, a normally open pivotal closure for the cage, a cam on each end member connected to rotate the closure about its pivotal axis, a relatively stationary element positioned and adapted to automatically engage and rotate said cam relative to the end member for closing the cage when said cage is rotated from its normal position, and another relatively stationary member positioned and adapted to engage and rotate said cam relative to the end member for opening the cage when it is turned to its normal position, and a member pivotally connecting the rotary end members for effecting conjoint rotation thereof.

14. In a device of the character described, a perforate member adapted to position doughnuts or the like in predetermined formation for immersion into a frying-liquid, a rotatable normally open cage above said member to embrace the doughnuts as they float in the liquid, and mechanism adapted to automatically close the cage when it is rotated from its normal position for turning the doughnuts.

15. In a device of the character described, a perforate member adapted to position doughnuts or the like in predetermined formation for immersion into a frying liquid, a rotatable cage normally open at its top and bottom positioned above said member to receive the doughnuts as they float in the liquid, and mechanism adapted to automatically close the cage when it is rotated from its normal position for turning the doughnuts.

16. In a device of the character described, a perforate member adapted to position doughnuts or the like in predetermined formation for immersion into a frying-liquid, a rotatable cage normally open at its top and bottom and closed along its sides, positioned above said member to receive the doughnuts as they float in the liquid, and mechanism adapted to automatically close the cage when it is rotated from its normal position for turning the doughnuts.

17. In a device of the character described, a perforate member adapted to position doughnuts or the like in predetermined formation for immersion into a frying-liquid, a rotatable normally open cage above said member to receive the doughnuts as they float in the liquid, and mechanism adapted to automatically close the cage when it is rotated from its normal position for turning the doughnuts and to open the cage when the same is turned to its normal position.

18. In a device of the character described, a normally open rotatable cage positioned to receive and turn doughnuts or the like that are floated in a liquid frying medium, inclusive of an end member, top and bottom pivoted closures in geared relation to each other, a cam on the end member connected to rotate the closures about their pivotal axes, and a relatively stationary contact member positioned and adapted to contact and rotate the cam relative to the cage when the latter is rotated from its normal position whereby the cage is closed to hold and turn the doughnuts.

19. In a device of the character described, a rotatable cage normally closed at its sides and normally open at its top and its bottom positioned to receive and turn doughnuts or the like that are floated in a liquid frying medium, inclusive of a rotary end member, pivotal complementary top and bottom closures in geared relation to each other, a cam on the end member connected to rotate the closures about their pivotal axes, a relatively stationary member positioned and adapted to contact and rotate the cam relative to the cage when the latter is rotated from its normal position to hold and turn the doughnuts, and another relatively stationary contact member positioned and adapted to rotate the cam to open the cage when said cage is turned to its normal position.

WILLIAM T. DUSTERDICK.